US012590741B2

(12) United States Patent
Shu

(10) Patent No.: US 12,590,741 B2
(45) Date of Patent: Mar. 31, 2026

(54) LUBRICANT RECOVERY SYSTEM FOR HEAT EXCHANGE SYSTEM AND HEAT EXCHANGE SYSTEM

(71) Applicant: CARRIER CORPORATION, Palm Beach Gardens, FL (US)

(72) Inventor: Biao Shu, Shanghai (CN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 305 days.

(21) Appl. No.: 17/252,969

(22) PCT Filed: May 22, 2020

(86) PCT No.: PCT/US2020/034192
§ 371 (c)(1),
(2) Date: Dec. 16, 2020

(87) PCT Pub. No.: WO2020/242932
PCT Pub. Date: Dec. 3, 2020

(65) Prior Publication Data
US 2022/0074633 A1     Mar. 10, 2022

(30) Foreign Application Priority Data
May 29, 2019     (CN) .......................... 201910456277.8

(51) Int. Cl.
*F25B 43/00*          (2006.01)
*F16N 7/40*           (2006.01)
(Continued)

(52) U.S. Cl.
CPC .............. *F25B 43/003* (2013.01); *F16N 7/40* (2013.01); *F16N 29/02* (2013.01); *F16N 39/06* (2013.01);
(Continued)

(58) Field of Classification Search
CPC .. F25B 43/003; F25B 31/004; F25B 2700/04; F25B 1/00; F25B 43/00; F16N 7/40;
(Continued)

(56) References Cited

U.S. PATENT DOCUMENTS 3,263,435 A    8/1966  Endress et al.
3,710,590 A    1/1973  Kocher
(Continued)

FOREIGN PATENT DOCUMENTS

CN    101191683 A       6/2008
CN    101949619 A  *  1/2011  .............. F25B 31/00
(Continued)

OTHER PUBLICATIONS

JP 2009293901 A Translation (Year: 2009).*
(Continued)

*Primary Examiner* — Jerry-Daryl Fletcher
*Assistant Examiner* — Dario Antonio Deleon
(74) *Attorney, Agent, or Firm* — CANTOR COLBURN LLP

(57)     ABSTRACT

A lubricant recovery system for a heat exchange system, and a heat exchange system. The heat exchange system includes a compressor, a condenser, an expansion device and an evaporator connected in sequence to form a loop, and further includes a reservoir for storing lubricant and in communication with the compressor, and the lubricant recovery system includes: a first flow path disposed between a suction chamber of the compressor and the reservoir, and having a first pump and a first filter, wherein the first pump is configured to pump a part of the lubricant in the suction chamber to the reservoir, and the first filter is disposed upstream of the first pump for filtering the lubricant; and/or
(Continued)

a second flow path disposed between the evaporator and the suction chamber, and having a second pump and a second filter.

12 Claims, 3 Drawing Sheets

(51) Int. Cl.
| | |
|---|---|
| *F16N 29/02* | (2006.01) |
| *F16N 39/06* | (2006.01) |
| *F25B 31/00* | (2006.01) |

(52) U.S. Cl.
CPC ........ *F25B 31/004* (2013.01); *F16N 2250/18* (2013.01); *F16N 2270/10* (2013.01); *F16N 2270/70* (2013.01); *F16N 2280/02* (2013.01); *F25B 2700/04* (2013.01)

(58) Field of Classification Search
CPC ...... F16N 29/02; F16N 39/06; F16N 2250/18; F16N 2270/10; F16N 2270/70; F16N 2280/02; F16N 19/003; F16N 23/00; F16N 31/02; F16N 39/02; F04D 13/12; F04D 29/063; F04B 39/0284
See application file for complete search history.

(56) References Cited

U.S. PATENT DOCUMENTS

| | | | | | |
|---|---|---|---|---|---|
| 4,575,320 | A | | 3/1986 | Kobayashi et al. | |
| 5,476,370 | A | | 12/1995 | Wood | |
| 5,586,450 | A | | 12/1996 | Tollar et al. | |
| 5,606,872 | A | * | 3/1997 | Terasaki | F04D 29/063 |
| | | | | | 62/471 |
| 6,065,297 | A | * | 5/2000 | Tischer et al. | F25B 31/008 |
| | | | | | 62/84 |
| 6,182,467 | B1 | * | 2/2001 | Zhong et al. | F25B 31/004 |
| | | | | | 62/470 |
| 8,186,179 | B2 | | 5/2012 | Takahashi et al. | |
| 8,408,024 | B2 | | 4/2013 | Ogata et al. | |
| 2004/0194485 | A1 | * | 10/2004 | Dudley | F25B 31/004 |
| | | | | | 62/193 |
| 2012/0291464 | A1 | | 11/2012 | Yoon et al. | |
| 2013/0086937 | A1 | | 4/2013 | Albertson et al. | |
| 2015/0159668 | A1 | | 6/2015 | Oda et al. | |
| 2016/0215927 | A1 | * | 7/2016 | Nelson et al. | F16N 29/02 |
| 2016/0265815 | A1 | | 9/2016 | Snell et al. | |
| 2017/0313273 | A1 | * | 11/2017 | Kim et al. | F16N 2280/02 |
| 2019/0257302 | A1 | * | 8/2019 | Stark et al. | F25B 31/004 |
| 2020/0224929 | A1 | * | 7/2020 | Sheaffer et al. | F25B 1/00 |

FOREIGN PATENT DOCUMENTS

| | | | | | | |
|---|---|---|---|---|---|---|
| CN | 202973662 | U | * | 6/2013 | | F25B 31/00 |
| CN | 105143789 | A | * | 12/2015 | | F25B 31/004 |
| CN | 105928268 | A | | 9/2016 | | |
| CN | 108507237 | A | | 9/2018 | | |
| CN | 109237829 | A | * | 1/2019 | | F25B 31/004 |
| DE | 102009019720 | A1 | | 11/2010 | | |
| JP | S5598965 | U | | 7/1980 | | |
| JP | 2009293901 | A | * | 12/2009 | | F25B 1/00 |
| WO | 2010122812 | A1 | | 10/2010 | | |

OTHER PUBLICATIONS

CN 105143789 A Translation (Year: 2015).*
CN 109237829 A Translation (Year: 2018).*
CN 101949619 A Translation (Year: 2011).*
CN 202973662 U Translation (Year: 2013).*
International Search Report; International Application No. PCT/US2020/034192; International Filing Date: May 22, 2020; Date of Mailing: Aug. 21, 2020; 6 pages.
Written Opinion; International Application No. PCT/US2020/034192; International Filing Date: May 22, 2020; Date of Mailing: Aug. 21, 2020; 15 pages.
European Search Report for Application No. 20732376.7, Issued Apr. 19, 2023, 5 Pages.

* cited by examiner

First
Controller

LUBRICANT RECOVERY SYSTEM FOR HEAT EXCHANGE SYSTEM AND HEAT EXCHANGE SYSTEM

CROSS REFERENCE TO RELATED APPLICATIONS

This application is a National Stage application of PCT/US2020/034192, filed May 22, 2020, which claims the benefit of Chinese Application No. 201910456277.8, filed May 29, 2019, both of which are incorporated by reference in their entirety herein.

FIELD OF THE INVENTION

The present invention relates to the technical field of heat exchange, and more particularly to a lubricant recovery system for a heat exchange system, and a heat exchange system including the lubricant recovery system.

BACKGROUND OF THE INVENTION

Existing technologies provide various types of heat exchange systems such as a Heating, Ventilation and Air Conditioning (HVAC) system and the like, which have been widely used in many industrial fields, places, etc., and can bring great convenience to people's daily production and life. In these existing heat exchange systems, a great number of various types of components, devices, units or apparatuses are provided to achieve functions such as cooling, heating, and air exchange. However, they still have some disadvantages and deficiencies, for example, in terms of structural construction, heat exchange effect, system performance, manufacturing and maintenance costs, etc., and can be further improved and optimized. As an example, for compressors in heat exchange systems, it is one of the key factors that ensure compressor oil can be effectively recovered so as to achieve stable operation of the compressors. In current oil recovery systems, an eductor (or referred to as an ejector) is commonly used, which requires a sufficient pressure difference between a condenser and an evaporator for a normal working. However, it is difficult to provide a reliable pressure difference in applications such as low lift, which will affect the working efficiency and operational safety of the entire system.

SUMMARY OF THE INVENTION

In view of the above, the present invention provides a lubricant recovery system for a heat exchange system and a heat exchange system including the lubricant recovery system, thereby solving or at least alleviating one or more of the problems described above as well as problems of other aspects existing in the prior art.

First, according to a first aspect of the present invention, a lubricant recovery system for a heat exchange system is provided, wherein the heat exchange system comprises a compressor, a condenser, an expansion device and an evaporator connected in sequence to form a loop, and further comprises a reservoir for storing lubricant and in communication with the compressor, and the lubricant recovery system comprises:

a first flow path disposed between a suction chamber of the compressor and the reservoir, and having a first pump and a first filter, wherein the first pump is configured to pump a part of the lubricant in the suction chamber to the reservoir, and the first filter is disposed upstream of the first pump for filtering the lubricant; and/or a second flow path disposed between the evaporator and the suction chamber, and having a second pump and a second filter, wherein the second pump is configured to pump a mixture of the lubricant and a refrigerant from the evaporator to the suction chamber, and the second filter is disposed upstream of the second pump for filtering the mixture.

In the lubricant recovery system according to the present invention, optionally, the lubricant recovery system further comprises a first liquid level control device configured to monitor a liquid level in the suction chamber, and a first controller configured to control the operation of the first pump according to the monitored liquid level.

In the lubricant recovery system according to the present invention, optionally, the first liquid level control device comprises at least one upper liquid level sensor and at least one lower liquid level sensor, which are configured to monitor an upper liquid level and a lower liquid level in the suction chamber respectively.

In the lubricant recovery system according to the present invention, optionally, the lubricant recovery system further comprises a second liquid level control device configured to monitor a liquid level in the evaporator, and a second controller configured to control the operation of the second pump according to the monitored liquid level.

In the lubricant recovery system according to the present invention, optionally, the first controller and the second controller are a same controller or independent controllers.

In the lubricant recovery system according to the present invention, optionally, the first flow path further has at least one first valve for controlling the flow of the lubricant in the first flow path, and/or the second flow path further has at least one second valve for controlling the flow of the mixture in the second flow path.

In the lubricant recovery system according to the present invention, optionally, the first flow path has two said first valves, which are disposed upstream of the first filter and downstream of the first pump respectively, and/or the second flow path has two said second valves, which are disposed upstream of the second filter and downstream of the second pump respectively.

In the lubricant recovery system according to the present invention, optionally, the first pump is a gas-liquid two-phase pump, which is at least partially submerged in the lubricant pumped by it, and/or the second pump is a gas-liquid two-phase pump, which is at least partially submerged in the fluid pumped by it.

In the lubricant recovery system according to the present invention, optionally, the first pump and/or the second pump are electromagnetic pumps, and the compressor is a centrifugal compressor, a rotary compressor, a turbo compressor, a reciprocating compressor or a screw compressor.

Moreover, according to a second aspect of the present invention, a heat exchange system is further provided, which comprises a compressor, a condenser, an expansion device and an evaporator that are connected in sequence to form a loop, and which further comprises a reservoir for storing lubricant and in communication with the compressor, wherein the heat exchange system further comprises any one of the lubricant recovery systems as described above.

From the following detailed descriptions combined with the accompanying drawings, the principles, features, characteristics, advantages and the like of the various technical solutions according to the present invention will be clearly understood. For example, as compared with the prior art, the technical solutions of the present invention are not only easy to be manufactured, installed and maintained with low cost and wide range of application, but also can replace equipment such as an eductor commonly used in current industry. The invention can effectively guarantee the lubricant recovery effect in the heat exchange system, and improve the working efficiency, safety and reliability of the system. Therefore, the invention has significant practicability.

BRIEF DESCRIPTION OF THE DRAWINGS

The technical solutions of the present invention will be further described in detail below with reference to the accompanying drawings and embodiments. However, it is noted that these drawings are designed merely for the purpose of explanation, are only intended to conceptually illustrate the structural configuration described herein, and are not required to be drawn to scale.

DETAILED DESCRIPTION OF THE EMBODIMENT(S) OF THE INVENTION

First, it is noted that the composition, working principle, characteristics, advantages and the like of the lubricant recovery system for a heat exchange system and the heat exchange system including the lubricant recovery system according to the present invention will be described below by way of example. However, it is understood that all the description is given merely for exemplary illustration, and should not be construed as limiting the present invention in any way.

Herein, the technical terms "first" and "second" are only used for the purpose of distinction, and are not intended to indicate their order and relative importance. In addition, for any single technical feature described or implied in the embodiments mentioned herein, or any single technical feature shown or implied in individual drawings, the present invention still allows for any combination or deletion of these technical features (or equivalents thereof) without any technical obstacle, thereby obtaining more other embodiments of the present invention that may not mentioned directly herein.

Figure 1:
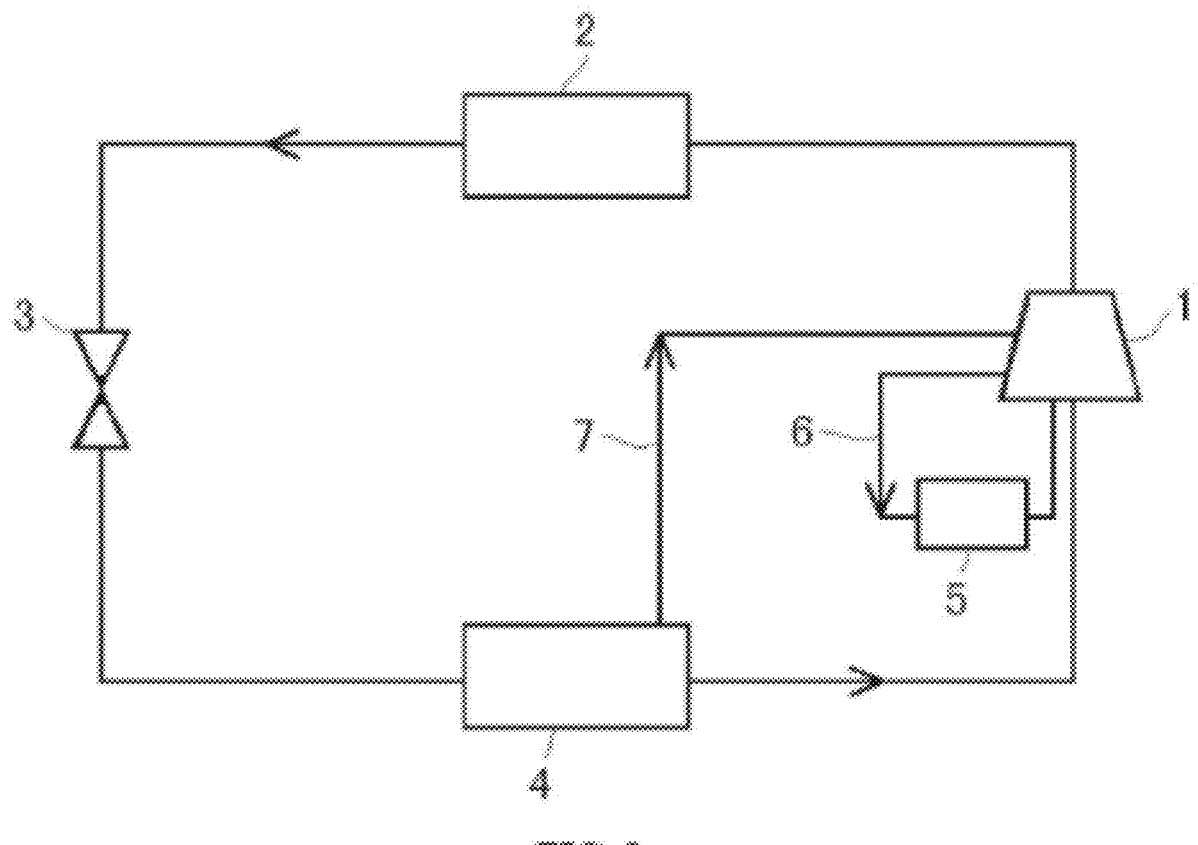
FIG. 1 is a schematic composition view of an embodiment of a heat exchange system according to the present invention, in which an example of a lubricant recovery system is shown.
Figure 2:
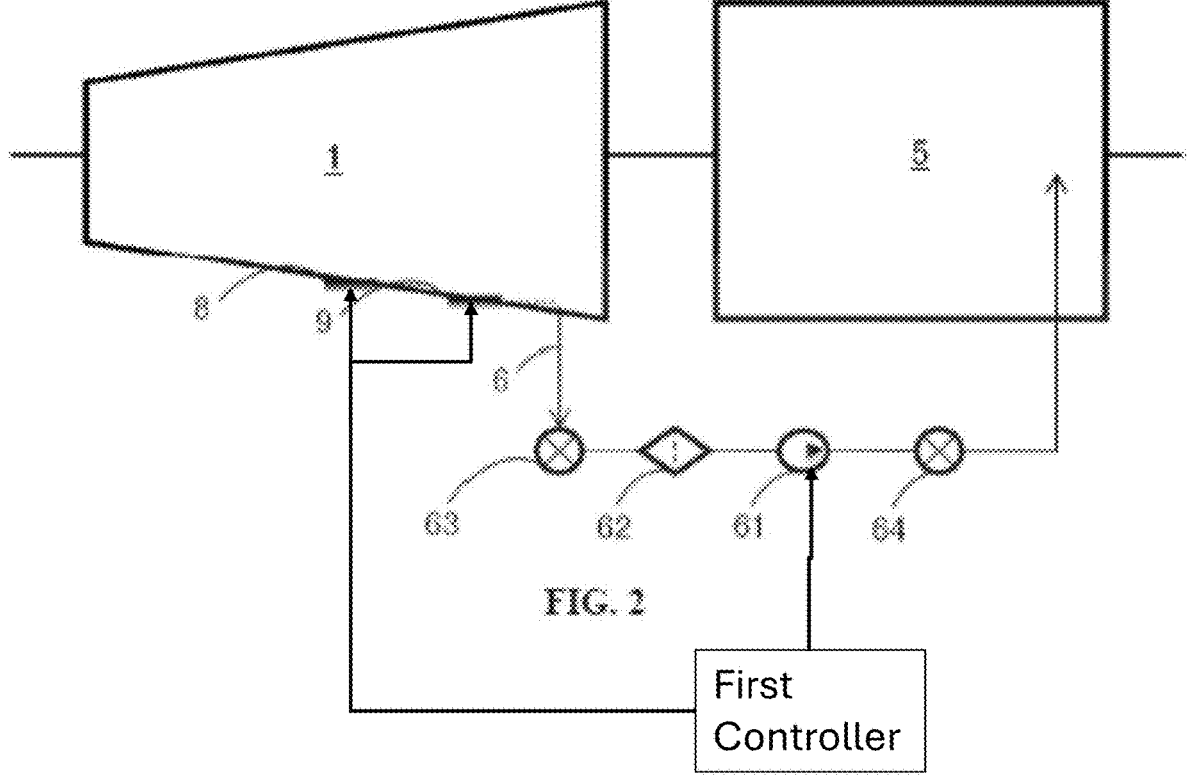
FIG. 2 is a schematic view showing the arrangement of a first flow path in the example of the lubricant recovery system shown in FIG. 1, and a compressor and a reservoir in the embodiment of the heat exchange system.
Figure 3:
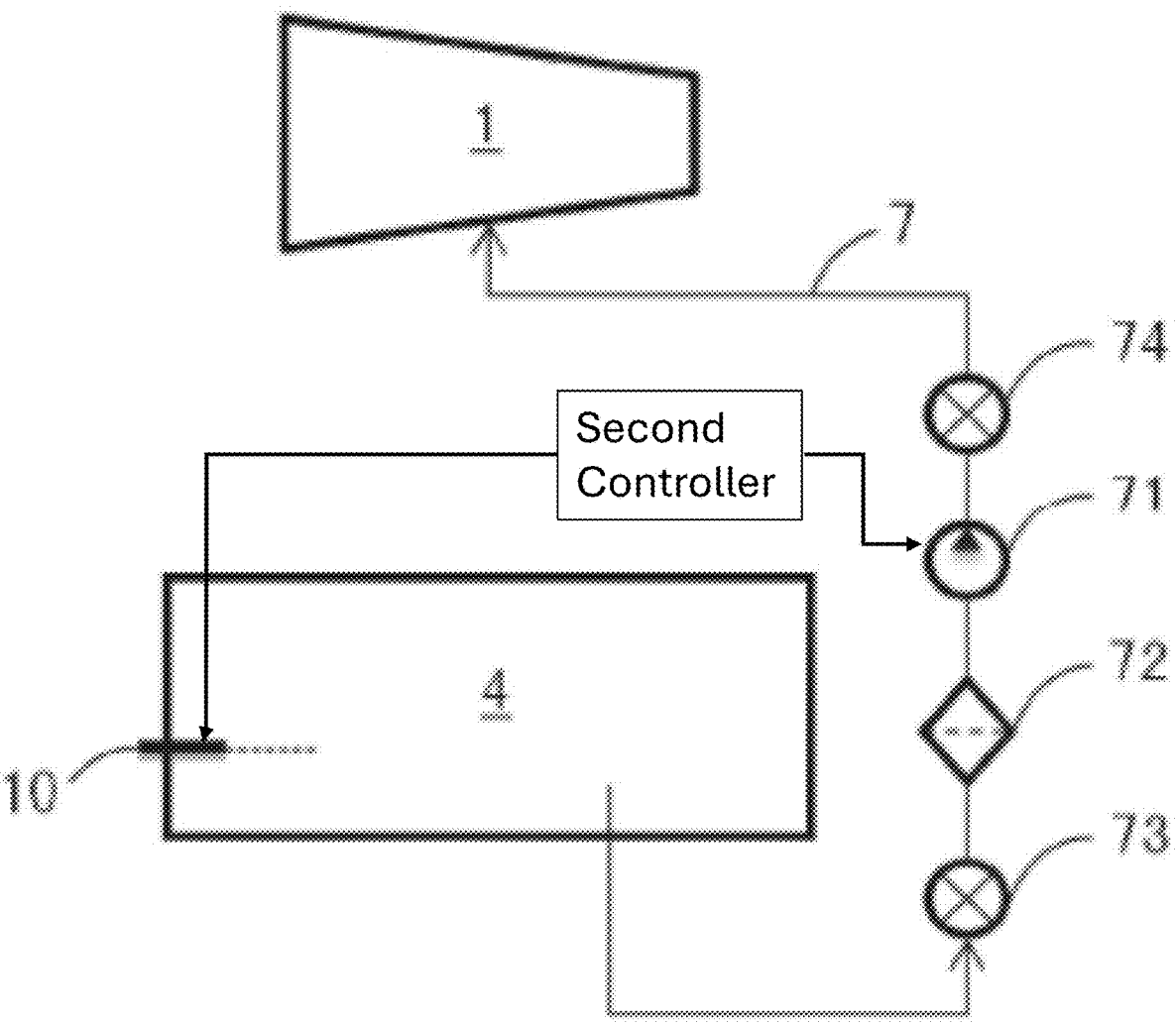
FIG. 3 is a schematic view showing the arrangement of a second flow path in the example of the lubricant recovery system shown in FIG. 1, and the compressor and the reservoir in the embodiment of the heat exchange system.

The general composition of an embodiment of a heat exchange system according to the present invention is schematically shown in FIG. 1, and the arrangement of a first flow path and a second flow path in an example of a lubricant recovery system therein are further shown in FIGS. 2 and 3. The technical solutions of the present invention will be described in detail below with reference to the above figures.

As illustrated in FIG. 1, in the embodiment of the heat exchange system, a compressor 1, a condenser 2, an expansion device 3 and an evaporator 4 which are connected in sequence to form a loop are provided, and a reservoir 5 is also provided for storing lubricant (such as various lubricant oils, etc.). These components may be connected and arranged together as shown in the figure, so that the heat exchange system can achieve functions such as cooling, heating and/or air exchange through the circulation of refrigerant in the system, and the recycling of lubricant can lubricate and cool the compressor and the like in the system.

It should be understood that the heat exchange system given above is only for exemplary illustration. In practical applications, any possible components, units, devices or apparatuses (such as heat exchangers, valves, condensers, economizers, oil-gas separators, expansion devices, etc.) may be added, reduced or replaced, and their specific models, arrangement positions, quantities and the like may be flexibly selected or set. For example, the compressor 1 may be selected from a centrifugal compressor, a rotary compressor, a turbo compressor, a reciprocating compressor, or a screw compressor. For another example, the lubricant stored in the reservoir 5 may be pumped, after heat exchange, to the compressor 1 through devices such as a pump, a heat exchanger and the like not shown in FIG. 1.

An example of a lubricant recovery system according to the present invention is provided in the embodiment of the heat exchange system of FIG. 1. The lubricant recovery system may include two flow paths for realizing lubricant recovery, namely a first flow path 6 and a second flow path 7. The first flow path 6 is arranged between a suction chamber of the compressor 1 and the reservoir 5 (FIG. 2), and the second flow path 7 is arranged between the evaporator 4 and the suction chamber (FIG. 3).

Referring to FIG. 2, the first flow path 6 is configured to recover the lubricant at the compressor 1 and return it to the reservoir 5, so that the heat exchange system can repeatedly recycle the lubricant stored in the reservoir 5. Thereby, positive effects such as lubrication, temperature reduction, and extended service life can be brought to the compressor 1 and the like in the heat exchange system. As illustrated in FIG. 2, a pump 61, a filter 62, a valve 63, and a valve 64 may be provided in the first flow path 6.

Specifically, the pump 61 is configured to pump a part of the lubricant in the suction chamber of the compressor 1 to the reservoir 5. In practical applications, the pump 61 may be any suitable pump device such as an electromagnetic pump. By arranging the pump 61 in the first flow path 6, a fast, stable and reliable recovery operation on the lubricant from the suction chamber of the compressor 1 to the reservoir 5 can be achieved even in applications such as a low lift, which is not possible with existing lubricant recovery systems (such as where an eductor is commonly used).

It is worth noting that if debris is present in the lubricant fluid flowing through the pump 61, the pump 61 may be prone to malfunction or damage. In order to avoid the above problems, the filter 62 may be arranged upstream of the pump 61 to filter out the above-mentioned debris, thereby ensuring and improving the safety and reliability of the system.

As illustrated in FIG. 2, the valve 63 and the valve 64 may be any suitable valve device such as a solenoid valve, and they can be arranged upstream of the filter 62 and downstream of the pump 61 respectively, so that the flow of the lubricant in the first path 6 can be flexibly controlled, which can facilitate operations such as system operation and maintenance, and repair, commissioning and replacement of devices. Of course, according to different application requirements, three or more valves may be provided in the first flow path 6, or only one valve may be provided. It should be understood that in the first flow path 6, the specific models, arrangement positions, numbers and the like of the valves discussed above may be flexibly selected or set.

Generally speaking, the lubricant exists mainly in a liquid form in the suction chamber of the compressor 1. It is not desirable to have too much or too little lubricant in the suction chamber. This is because once the lubricant in the suction chamber of the compressor 1 is too much, it may affect the effective suction amount of the compressor 1 and is not advantageous for its stable and efficient operation: however, if the lubricant in the suction chamber of the compressor 1 is too little, it may cause the pump 61 to fail to run stably and reliably for a long period of time. For example, in unfavorable situations, the pump 61 may need to be frequently shut down to avoid idling of the pump caused by lack of lubricant or a considerably small amount of lubricant in the suction chamber. Therefore, the lubricant recovery system may be provided with a first liquid level control device and a first controller so that the first liquid level control device is configured to monitor a liquid level in the suction chamber of the compressor 1 and the first controller is configured to control the operation of the pump 61 according to the monitored liquid level, thereby always maintaining a proper amount of lubricant in the suction chamber of the compressor 1, and avoiding an undesired phenomenon of too much or too little liquid in the suction chamber. This will be very helpful to ensure that the compressor 1, the pump 61 and the like can run for a long period of time reliably and efficiently.

In optional situations, one or more upper liquid level sensors 8 may be arranged in the suction chamber of the compressor 1 and one or more lower liquid level sensors 9 may be arranged at the same time, as illustrated in FIG. 2, for monitoring an upper liquid level and a lower liquid level of the liquid in the suction chamber of the compressor 1 separately, so as to obtain the current liquid amount condition in the suction chamber.

In addition, in optional situations, the above-mentioned first controller may be implemented by any suitable hardware, software, or a combination thereof. The first controller may be provided separately or integrated into a control device of the pump 61 itself, or integrated into any suitable component, unit, module, device or apparatus of the heat exchange system.

Referring to FIG. 3 again, the second flow path 7 is configured to convey a mixture of lubricant and refrigerant at the evaporator 4 (which may typically exist in the form of two phases of gas and liquid) together to the suction chamber of the compressor 1. The lubricant entering the suction chamber may be recycled after being recovered by the first flow path 6 described above, or it may also be recycled after being recovered by an existing recovery system (such as one including an eductor).

As illustrated in FIG. 3, a pump 71, a filter 72, a valve 73 and a valve 74 may be provided in the second flow path 7. Also, a second liquid level control device and a second controller may be provided. The second liquid level control device may use a liquid level sensor 10, for example, to monitor a liquid level in the evaporator 4, and the second controller may be configured to control the operation of the pump 71 according to the monitored liquid level, so as to avoid occurrence of adverse phenomena such as idling of the pump 71 caused for example by lack of the mixture liquid in the evaporator 4 or a considerably small amount of the mixture liquid in the evaporator 4.

It should be noted that unless otherwise specified herein, the relevant description of the pump 61, the filter 62, the valve 63, the valve 64, the first liquid level control device and the first controller in the first flow path 6 given above may also be respectively applied to the pump 71, the filter 72, the valve 73, the valve 74, the second liquid level control device and the second controller in the second flow path 7 identically or similarly, and a repeated description is therefore omitted herein. In addition, it should be noted that the above-mentioned first controller and second controller may be implemented independently, or they can be integrated in a same controller. Such controllers may be implemented by hardware, software, or a combination thereof.

The present invention allows for various possible flexible designs, changes and adjustments according to actual application conditions, without departing from the spirit of the present invention.

For example, in some embodiments, only the first flow path 6 or the second flow path 7 may be provided to replace a part of the recovery flow path of an existing lubricant recovery system (such as where an eductor is provided). For another example, in some embodiments, the above-mentioned valve 63, valve 64, valve 73 and valve 74 may not be provided, and the first liquid level control device and the first controller, or the second liquid level control device and the second controller may also be removed in order to meet actual requirements in some applications such as simplifying the system and reducing costs.

In addition, as for the above-mentioned pumps 61 and 71, any type of pump devices may be used for them. For example, a pump device suitable for a gas-liquid two-phase environment may be used so that it can be partially or completely submerged in the pumped fluid (such as the lubricant or the mixture). This arrangement is very advantageous for cooling the pump itself during the operation and lowering its temperature, so that the pump is able to work reliably for a longer period of time, which can effectively ensure an efficient and stable operation of the entire system. Of course, according to the actual requirements in different applications, the above-mentioned gas-liquid two-phase pump may not be used for the pump 61 and/or the pump 71, and other types of pump devices (for example, pump devices that do not need to be submerged in liquid) are used instead, which is allowed in the technical solutions of the present invention.

The lubricant recovery system for a heat exchange system and the heat exchange system including the lubricant recovery system according to the present invention are explained in detail above by way of example only. These examples are only used to explain the principle of the present invention and embodiments thereof, and are not intended to limit the present invention. Those skilled in the art may also make various modifications and improvements without departing from the spirit and scope of the present invention. Therefore, all equivalent technical solutions shall fall within the scope of the present invention and be defined by the claims of the present invention.

The invention claimed is:

1. A lubricant recovery system for a heat exchange system, the heat exchange system comprising a compressor, a condenser, an expansion device and an evaporator connected in sequence to form a loop, and further comprising a reservoir for storing lubricant and in communication with the compressor, and the lubricant recovery system comprising:

a first flow path disposed between a suction chamber of the compressor and the reservoir, and having a first pump and a first filter, wherein the first pump pumps a part of the lubricant in the suction chamber to the reservoir, and the first filter is disposed upstream of the first pump for filtering the lubricant, wherein the first pump is an electromagnetic pump; and a second flow path disposed between the evaporator and the suction chamber, and having a second pump and a second filter, wherein the second pump pumps a mixture of the lubricant and a refrigerant from the evaporator to the suction chamber, and the second filter is disposed upstream of the second pump for filtering the mixture, wherein the second pump is one of an electromagnetic pump or a gas-liquid two-phase pump.

2. The lubricant recovery system according to claim 1, wherein the lubricant recovery system further comprises a first liquid level control device configured to monitor a liquid level in the suction chamber, and a first controller configured to control the operation of the first pump according to the monitored liquid level.

3. The lubricant recovery system according to claim 2, wherein the first liquid level control device comprises at least one upper liquid level sensor and at least one lower liquid level sensor, which are configured to monitor an upper liquid level and a lower liquid level in the suction chamber respectively.

4. The lubricant recovery system according to claim 2, wherein the lubricant recovery system further comprises a second liquid level control device configured to monitor a liquid level in the evaporator, and a second controller configured to control the operation of the second pump according to the monitored liquid level.

5. The lubricant recovery system according to claim 4, wherein the first controller and the second controller are a same controller or independent controllers.

6. The lubricant recovery system according to claim 1, wherein the first flow path further has at least one first valve for controlling the flow of the lubricant in the first flow path, and the second flow path further has at least one second valve for controlling the flow of the mixture in the second flow path.

7. The lubricant recovery system according to claim 6, wherein the first flow path has two said first valves, which are disposed upstream of the first filter and downstream of the first pump respectively, and the second flow path has two said second valves, which are disposed upstream of the second filter and downstream of the second pump respectively.

8. The lubricant recovery system according to claim 1, wherein the second pump is a gas-liquid two-phase pump at least partially submerged in the fluid pumped by the second pump.

9. The lubricant recovery system according to claim 1, wherein the second pump is an electromagnetic pump, and the compressor is a centrifugal compressor, a rotary compressor, a turbo compressor, a reciprocating compressor or a screw compressor.

10. A heat exchange system, comprising a compressor, a condenser, an expansion device and an evaporator which are connected in sequence to form a loop, and further comprising a reservoir for storing lubricant and in communication with the compressor, wherein the heat exchange system further comprises the lubricant recovery system according to claim 1.

11. The lubricant recovery system according to claim 1, wherein the second flow path directly connects the evaporator to the suction chamber.

12. The lubricant recovery system according to claim 1, wherein the first flow path directly connects the suction chamber to the reservoir.

* * * * *